Figure 1:
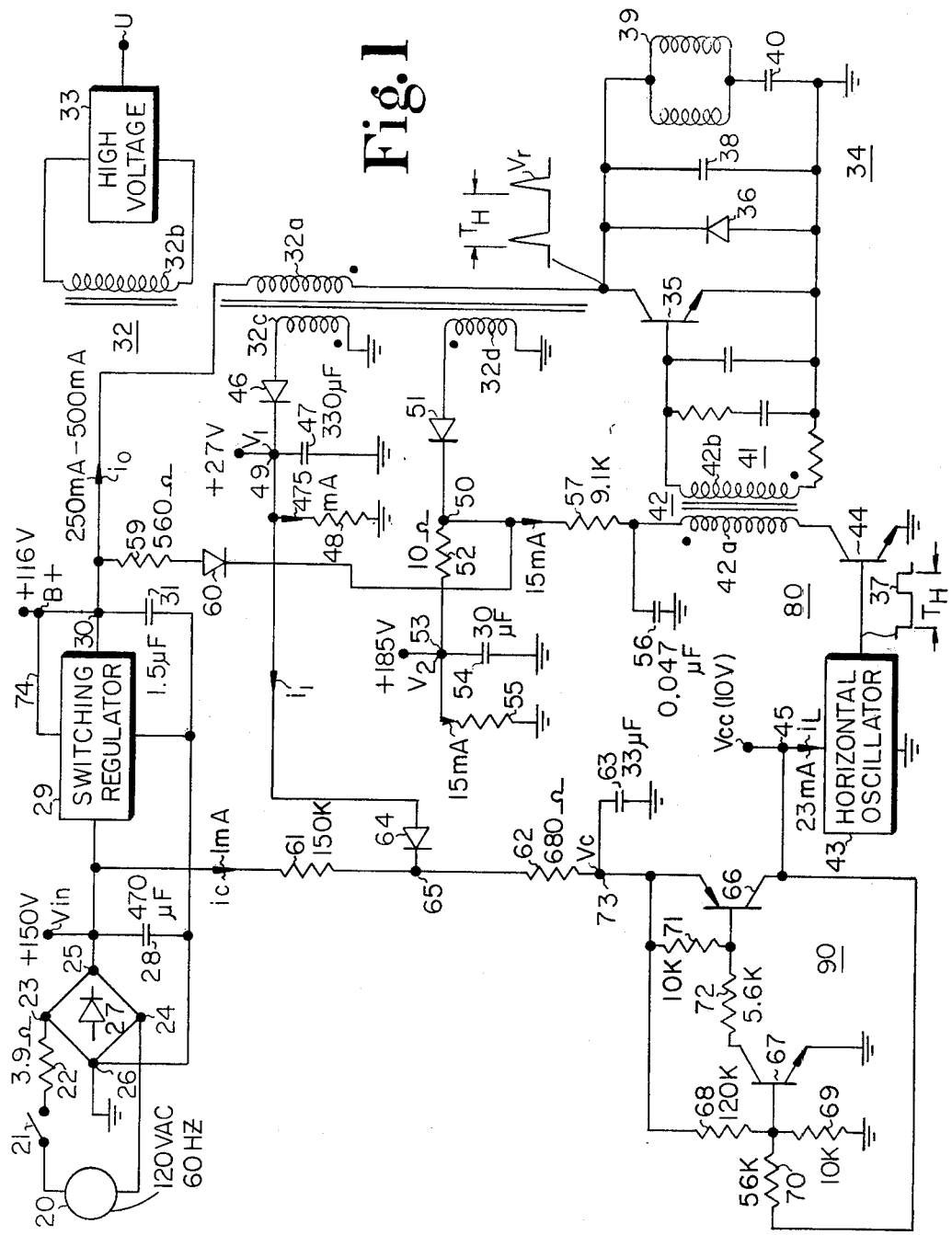

United States Patent [19]

Luz

[11] 4,429,259
[45] Jan. 31, 1984

[54] HORIZONTAL DEFLECTION CIRCUIT WITH A START-UP POWER SUPPLY

[75] Inventor: David W. Luz, Indianapolis, Ind.

[73] Assignee: RCA Corporation, New York, N.Y.

[21] Appl. No.: 276,305

[22] Filed: Jun. 22, 1981

Related U.S. Application Data

[63] Continuation of Ser. No. 186,789, Sep. 12, 1980.

[51] Int. Cl.³ .................... H01J 29/70; H01J 29/76
[52] U.S. Cl. .................................. 315/408; 358/190
[58] Field of Search ................ 315/411, 408; 358/190

[56] References Cited

U.S. PATENT DOCUMENTS

| | | | |
|---|---|---|---|
| 3,621,134 | 11/1971 | Waring | 178/7.3 R |
| 3,891,892 | 6/1975 | Bohringer | 315/411 |
| 3,898,525 | 8/1975 | Steckler | 315/411 |
| 3,908,159 | 9/1975 | Griffey | 321/11 |
| 4,178,536 | 12/1979 | Manners | 315/408 |
| 4,246,634 | 1/1981 | Purol | 363/49 |

Primary Examiner—Theodore M. Blum
Attorney, Agent, or Firm—E. M. Whitacre; P. J. Rasmussen; Joseph Laks

[57] ABSTRACT

In a horizontal deflection circuit, a horizontal oscillator, energized by a supply voltage, develops a horizontal frequency switching signal. A deflection outputs stage is responsive to the switching signal and generates scanning current in a horizontal deflection winding. After commencement of oscillator operation, the voltage developed across a secondary winding of a flyback transformer is rectified and filtered and applied to the horizontal oscillator as the oscillator energizing supply voltage. A start-up supply for developing the oscillator supply voltage during an initial interval includes a source of voltage that is available for use prior to the commencement of oscillator operation, a capacitor, a charging circuit for charging the capacitor from the available voltage source, and a controllable switch coupled to the capacitor and to the oscillator. After the charging circuit has charged the capacitor to a predetermined threshold voltage level, the controllable switch is made conductive to apply the capacitor voltage to the oscillator to commence oscillator operation. The switch is arranged with the capacitor as a relaxation oscillator to begin discharging the capacitor by the load current drawn by the horizontal oscillator. Should the capacitor discharge to a lower threshold level before the flyback-derived supply voltage is developed, the relaxation oscillator changes states to disconnect the horizontal oscillator from the capacitor to initiate a capacitor recharging cycle.

12 Claims, 2 Drawing Figures

HORIZONTAL DEFLECTION CIRCUIT WITH A START-UP POWER SUPPLY

This is a continuation of application Ser. No. 186,789, filed Sept. 12, 1980.

This invention relates to start-up supplies for horizontal deflection circuits.

In a television receiver, the supply voltages to power various television receiver circuits such as the vertical deflection circuit and the audio and video circuits are derived from rectified and filtered flyback pulses developed by the horizontal deflection circuit. After the horizontal oscillator in the deflection circuit has commenced operation, the supply voltage for the oscillator is also derived from rectified and filtered flyback pulse voltages.

When the television receiver is turned on, the flyback pulse voltages are absent. A start-up supply for the horizontal oscillator is therefore required in order to energize the oscillator and develop the flyback-derived power supply voltages for the television receiver. A voltage that is available to power the oscillator during the start-up interval after the television receiver is turned on is the DC input voltage obtained by rectifying and filtering the AC mains supply voltage.

Since the horizontal oscillator is designed to use a relatively low supply voltage, the DC input voltage during start-up may be applied to the oscillator through a dropping resistor. The value of the resistor is selected to be relatively large in order to minimize the dissipation in the resistor while at the same time providing the horizontal oscillator with at least the minimum amount of current required to initiate oscillator operation. After the flyback-derived supply voltage becomes available, the normal load current for the oscillator is provided from this supply excluding the load current still being provided by the dropping resistor. Thus, the dropping resistor dissipates a significant amount of power even during steady-state television receiver operation after the start-up interval has elapsed.

To eliminate power dissipation in the dropping resistor during steady-state operation, some start-up circuits include a transistor switch in series with the dropping resistor. When the steady-state flyback-derived supply voltage for the oscillator is developed, the switch becomes reverse biased, disconnecting the dropping resistor from the oscillator. A relatively expensive switch is required that is capable of withstanding the off-state voltage stress applied to it. This off-state voltage equals the difference between the DC input voltage and the oscillator supply voltage.

A feature of the invention is the design of an oscillator-derived power supply with start-up circuitry that dissipates relatively little power during steady-state operation after the oscillator has commenced operation. An oscillator energized by the voltage developed at a supply terminal produces an output signal that is used by a subsequent power supply stage to develop a steady-state voltage to energize the load circuit. The steady-state voltage is also applied to the oscillator to maintain it energized after commencement of oscillator operation. A start-up voltage supply to energize the oscillator into commencing operation comprises a capacitor, a source of energy that is available prior to the commencement of oscillator operation, a charging circuit for charging the capacitor from the energy source, and switching means interposed between the capacitor and the oscillator. The switching means applies the capacitor voltage to the oscillator after the capacitor has charged to a first threshold level, thereby commencing oscillator operation and the development of the steady-state voltage by the oscillator responsive power supply.

With such an arrangement, the charging current flowing to the capacitor may be selected to be of relatively low magnitude, much lower than even the minimum amount of load current required to energize the oscillator. Dissipation in the charging circuit is substantially reduced, even though the charging circuit may still be supplying current during steady-state operation after commencement of oscillator operation.

During the start-up interval, the oscillator draws more current from the capacitor than is being supplied by the charging circuit, resulting in the capacitor being discharged. Another feature of the invention is that should the capacitor discharge to a lower threshold level, indicating that the steady-state voltage supply is still unavailable for use, the switching means disconnects the capacitor from the oscillator, enabling the capacitor to recharge and reinitiate the start-up sequence.

Figure 2:
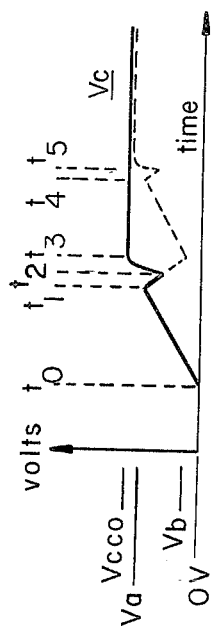

FIG. 1 illustrates a horizontal deflection circuit with derived power supplies and with a start-up circuit for the deflection oscillator; and FIG. 2 illustrates waveforms associated with the circuit of FIG. 1.

In FIG. 1, a source 20 of AC mains supply voltage is coupled to input terminals 23 and 24 of a full-wave bridge rectifier 27. Source 20 is coupled to input terminal 23 through an on/off switch 21 and a current limiting resistor 22. A filter capacitor 28 is coupled across output terminal 25 of bridge rectifier 27 and the current return or ground terminal 26. A filtered but unregulated DC input voltage $V_{in}$ is developed at terminal 25 and applied to a regulator 29. Regulator 29 may be a conventional switching regulator, such as described in U.S. Pat. No. 4,147,964, D. W. Luz et al., entitled "COMPLEMENTARY LATCHING DISABLING CIRCUIT", using an SCR regulator switch operated at the horizontal deflection frequency of a television receiver to produce a regulated B+ voltage at a terminal 30. Feedback of the B+ voltage to the switching regulator is provided by a conductor line 74. A filter capacitor 31 is provided to filter out horizontal rate ripple voltage from terminal 30.

The B+ voltage developed at terminal 30 is applied through the primary winding 32a of a flyback transformer 32 to the collector of a horizontal output transistor 35 in a horizontal deflection output stage 34 of a horizontal deflection circuit 80. Horizontal deflection circuit 80 includes a horizontal oscillator 43, energized by a supply voltage $V_{cc}$ developed at a supply terminal 45 and drawing a load current $i_L$ therefrom, a horizontal driver transistor 44 and horizontal output stage 34. Horizontal output stage 34 comprises horizontal output transistor 35, a damper diode 36, a retrace capacitor 38 and the series arrangement of a horizontal deflection winding 39 and an S-shaping or trace capacitor 40.

Horizontal oscillator 43, when energized by the voltage developed at supply terminal 45, produces a horizontal frequency, $1/T_H$, output switching signal 37 that is inverted by horizontal driver transistor 44 and applied to horizontal output transistor 35 through a driver transformer 42 to produce the switching action needed to generate horizontal scanning current in horizontal deflection winding 39. A waveshaping and filtering network 41 is coupled between the secondary winding 42b of driver transformer 42 and the base and emitter electrodes of output transistor 35.

Horizontal output transistor 35 is turned on early within the trace interval of each deflection cycle to conduct the horizontal scanning current after damper diode 36 is cut off and is turned off to initiate the horizontal retrace interval. During horizontal retrace, a retrace pulse voltage $V_r$ is developed at the collector of horizontal output transistor 35 and applied to flyback transformer primary winding 32a to develop alternating polarity horizontal retrace pulse voltages across secondary windings 32b–32d.

The high voltage developed across winding 32b is applied to a high voltage circuit 33 to develop a DC ultor accelerating potential at a terminal U. The voltage across flyback transformer secondary winding 32c is rectified by a diode 46 during the horizontal trace interval and filtered by a capacitor 47 to develop a DC supply voltage $V_1$ at a terminal 49. Supply voltage $V_1$ energizes and provides current to such television receiver load circuits as the vertical deflection circuit and the audio circuit, designated in FIG. 1 generally as a resistor 48. The voltage across flyback transformer secondary winding 32d is rectified during the horizontal retrace interval by a diode 51 and applied to a supply terminal 53 through a current limiting resistor 52 to develop a DC supply voltage $V_2$ across a filter capacitor 54. The DC supply voltage $V_2$ energizes and provides current to such television receiver load circuits as the video driver circuit designated in FIG. 1 generally as a resistor 55.

The rectified and filtered voltage from flyback transformer winding 32d also supplies the collector voltage for horizontal driver transistor 44. The substantially DC voltage developed at the cathode of diode 51 at terminal 50 is applied through a resistor 57 and primary winding 42a of driver transformer 42 to the collector of driver transistor 44. A capacitor 56 provides horizontal rate filtering.

When the television receiver is turned on, after closure of on/off switch 21, the unregulated DC input voltage $V_{in}$ is developed at terminal 25 and applied to switching regulator 29 to develop a voltage at B+ terminal 30. During the initial or start-up interval following closure of on/off switch 21, the flyback-derived supply voltages $V_1$ and $V_2$ are absent. To generate these voltages, switching action of horizontal output transistor 35 must be initiated by initiating or commencing the switching actions of horizontal oscillator 43 and driver transistor 44. Energization of these two elements, 43 and 44, must be obtained from voltage or energy sources that are available for use prior to commencement of operation of horizontal oscillator 43 and driver transistor 44.

The voltage used during start-up for providing collector supply voltage to driver transistor 44 is the voltage developed at B+ terminal 30 after closure of on/off switch 21. Terminal 30 is coupled to terminal 50 through a resistor 59 and a diode 60. Collector voltage for driver transistor 44 is obtained from B+ terminal 30 during start-up by way of resistor 59 and diode 60.

A start-up supply 90 is provided to initially develop supply voltage for horizontal oscillator 43 to energize the oscillator into commencing operation. Start-up supply 90 comprises a capacitor 63, a transistor switch 66 interposed between capacitor 63 and horizontal oscillator 43 at the supply terminal 45, a source of energy or voltage available prior to commencement of oscillator operation, namely the source of the DC input voltage $V_{in}$, and a charging resistor 61 that is used to charge capacitor 63 during the start-up interval from the DC input voltage terminal 25 by way of a resistor 62. Resistor 62 is a relatively low valued resistor used for a purpose hereinafter to be described.

Upon closure of on/off switch 21 and the development of a DC voltage $V_{in}$ at terminal 25, a charging current $i_c$ begins to flow through resistor 61 and resistor 62 to terminal 73, the junction of capacitor 63 and the emitter of controllable transistor switch 66. Capacitor 63 is initially uncharged and the voltage $V_c$ at terminal 73 is zero, maintaining transistor switch 66 in the off-state immediately after closure of on/off switch 21.

The base of transistor switch 66 is coupled to the collector of a transistor 67 through a resistor 72. A biasing network for transistors 66 and 67, comprising resistors 68–72, establishes at terminal 73 an upper threshold voltage level $V_a$ and a lower threshold voltage level $V_b$ so as to enable transistors 66 and 67 to form with capacitor 63 a relaxation oscillator arrangement. When transistor 66 is cut off, resistor 70 is effectively in parallel with resistor 69, thereby establishing the upper threshold voltage level $V_a$ of FIG. 2; and when transistor 66 is in saturated conduction, resistor 70 is effectively in parallel with resistor 68, thereby establishing the lower threshold voltage level $V_b$.

As illustrated in FIG. 2 by the solid-line waveform of the voltage $V_c$, at a time $t_0$, on/off switch 21 is closed and the charging current $i_c$ flowing from terminal 73 begins to charge capacitor 63. At time $t_1$, capacitor 63 has charged to the upper threshold voltage level $V_a$, turning on transistor 67 which turns on transistor switch 66 into saturated conduction. After transistor 66 becomes conductive, the voltage across capacitor 63 is applied to horizontal oscillator 43 at supply terminal 45 as a start-up supply voltage for the horizontal oscillator. Horizontal oscillator 43 commences operation and begins producing the horizontal rate switching signal 37 to initiate the switching action of horizontal driver transistor 44 and horizontal output transistor 35, thereby initiating the development of the horizontal retrace pulse voltage $V_r$ and the horizontal retrace pulse voltages across flyback transformer secondary windings 32b–32d.

The load current $i_L$ being drawn by horizontal oscillator 43 during the initial or start-up interval, after time $t_1$ of FIG. 2, is of greater magnitude than the charging current $i_c$ flowing to terminal 73 from charging resistor 61. Thus, after time $t_1$, horizontal oscillator 43 begins discharging capacitor 63 as illustrated in FIG. 2 by the decreasing voltage $V_c$ after time $t_1$. Even though the voltage $V_c$ applied to horizontal oscillator 43 during the start-up interval after time $t_1$ is decreasing, it is still sufficiently greater than the minimum voltage needed to maintain the oscillator operating. Thus, the horizontal rate switching signal is still being produced by horizontal oscillator 43 after time $t_1$. By time $t_2$ of FIG. 2, a sufficient period has elapsed so as to enable a substantial buildup of the flyback-derived supply voltage $V_1$ at terminal 49. Supply voltage $V_1$ is then applied to horizontal oscillator 43 by way of a diode 64 that has its cathode coupled to terminal 65, the junction of charging resistor 61 and resistor 62. Diode 64 blocks the flow of charging current to flyback supply terminal to prevent undue shunting of the current from oscillator 43 during start-up.

Near time $t_2$, the flyback-derived supply voltage $V_1$ has increased sufficiently so as to be able to generate a current $i_1$ flowing out of supply terminal 49 that is greater than the load current $i_L$ being drawn by horizontal oscillator 43. Thus, after time $t_2$, capacitor 63 ceases discharging and becomes charged shortly thereafter to a relatively constant voltage level $V_{cc0}$, as illustrated by the solid-line waveform of FIG. 2 after time $t_2$.

The voltage $V_{cc0}$ maintains transistor switch 66 conducting and is applied via the transistor to horizontal oscillator 43 as the steady-state supply voltage. Thus, the steady-state supply voltage $V_{cc0}$ is obtained from the flyback-derived supply voltage $V_1$. Because the flyback-derived supply voltage $V_1$ also functions as a supply voltage for other television receiver loads, the voltage $V_1$ is not necessarily of the ideal magnitude to energize horizontal oscillator 43. Typically, the voltage $V_1$ is slightly greater in magnitude than is desirable for use by horizontal oscillator 43. Resistor 62 is therefore provided to generate a voltage drop to establish the correct lower voltage $V_{cc0}$ at supply terminal 45.

During steady-state operation, the load current $i_L$ for horizontal oscillator 43 comprises the sum of the current $i_1$ obtained from flyback supply terminal 49 and the charging current $i_c$ obtained from charging resistor 61, if the biasing currents to transistors 66 and 67 are neglected. Thus, even during steady-state operation, the charging current $i_c$ flows through resistor 61.

To keep power dissipation in charging resistor 61 to a relatively small amount especially during steady-state operation, the magnitude of the charging current $i_c$ is kept at a relatively small value, illustratively at 5% or less of the steady-state load current of horizontal oscillator 43 and 10 times less than the minimum load current needed to maintain horizontal oscillator 43 operating at start-up. By providing a transistor 66 interposed between capacitor 63 and oscillator supply terminal 45, the current required to flow through the resistance that is coupled between the DC input voltage $V_{in}$ and oscillator 43 may be kept relatively small to reduce steady-state dissipation. Sufficient start-up load current to horizontal oscillator 43 is available, nonetheless, due to the charge buildup on capacitor 63 and the subsequent discharge of the capacitor.

The values of the upper threshold voltage level $V_a$ and of the capacitance of capacitor 63 may be selected such that for almost every deflection circuit operating condition encountered, sufficient time is available after capacitor 63 begins to be discharged by the load current drawn by horizontal oscillator 43 to enable the flyback-derived supply voltage $V_1$ to subsequently take over energization of the oscillator before the capacitor has discharged to a voltage less than the minimum required to maintain operation of the oscillator.

Another feature of the invention is to arrange transistor switch 66, transistor 67 and capacitor 63 as a relaxation oscillator. By providing a relaxation oscillator arrangement, start-up of horizontal deflection circuit 80 is ensured for practically all operating conditions encountered by horizontal deflection circuit 80. For example, a situation may be encountered during start-up where the DC input voltage $V_{in}$ is extremely low and the loading on flyback transformer 32 is extremely high. In such an operating situation, a much longer interval after the initiation of start-up may be required to build up the flyback-derived supply voltage $V_1$ to a satisfactory level. If capacitor 63 discharges to a level below the minimum necessary to maintain horizontal oscillator 43 in operation before the voltage $V_1$ builds up to a satisfactory level, start-up of deflection circuit 80 is defeated.

To prevent such a situation from occurring, the relaxation oscillator arrangement of start-up supply 90 establishes a lower threshold voltage level $V_b$ when transistor switch 66 is conductive. Should capacitor 63 discharge to the lower threshold voltage level $V_b$, as illustrated by FIG. 2 by the dashed-line waveform of the voltage $V_c$ after time $t_2$, indicating a failure of the flyback-derived supply voltage $V_1$ to build up to a satisfactory level, transistor 67 is biased off, thereby turning off transistor switch 66. The value of the lower threshold voltage level $V_b$ may be selected as greater than the minimum voltage needed to maintain oscillator 43 functioning.

With transistor switch 66 cut off at time $t_3$, a start-up charging cycle for capacitor 63 is reinitiated. As illustrated in FIG. 2 by the dashed-line waveform, capacitor 63 recharges from time $t_3$ to time $t_4$, at which time the upper threshold voltage level $V_a$ is again reached at terminal 73 to turn on transistor switch 66 at time $t_4$. The voltage across capacitor 63 is again applied to horizontal oscillator 43 to recommence oscillator operation and to continue the buildup of flyback-derived supply voltage $V_1$ so that by time $t_5$ the supply voltage $V_1$ has increased sufficiently to take over supplying current to horizontal oscillator 43. Shortly after time $t_5$, the steady-state supply voltage $V_{cc0}$ at supply terminal 45 is established.

The relaxation oscillator arrangement of start-up supply 90 can provide as many charge/discharge cycles for capacitor 63 as may be required in order to build up the flyback-derived supply voltage $V_1$ to the levels needed to maintain steady-state deflection circuit operation.

What is claimed is:

1. An oscillator-derived power supply with start-up circuitry, comprising:
   a supply terminal;
   an oscillator being energized by the voltage developed at said supply terminal for producing an oscillator output signal;
   a start-up voltage supply to energize said oscillator into commencing operation, said start-up voltage supply comprising:
   a capacitor,
   a source of DC input voltage available prior to commencement of oscillator operation,
   means for charging said capacitor from said DC input voltage source, and
   switching means interposed between said capacitor and said supply terminal for applying said capacitor voltage to said oscillator after said capacitor has charged to a first threshold level, to commence oscillator operation;
   means responsive to said oscillator output signal for developing a steady-state voltage; and
   means for applying said steady-state voltage to said supply terminal via said switching means to maintain oscillator energization during steady-state operation.

2. A supply according to claim 1 wherein the minimum load current required by said oscillator to commence operation exceeds in magnitude the current being provided to said capacitor by said charging means.

3. A supply according to claim 2 wherein said capacitor is being discharged to lower voltage by said oscillator after said switching means applies said capacitor voltage to said supply terminal and prior to steady-state oscillator operation.

4. A supply according to claim 3 wherein said steady-state voltage maintains said capacitor charged to a substantially constant voltage level during said steady-state operation.

5. A supply according to claim 4 wherein said DC input voltage is of greater magnitude than the magnitude of said substantially constant voltage level.

6. A supply according to claim 4 wherein said switching means serves to disconnect said capacitor from said supply terminal when said capacitor discharges to a second threshold level lower than said first threshold level to enable said capacitor to recharge.

7. A supply according to claim 6 wherein said steady-state voltage applying means comprises a diode blocking current flow from said charging means to said steady-state voltage developing means.

8. A supply according to any preceding claim wherein said oscillator comprises a deflection generator oscillator and wherein said oscillator output signal responsive means comprises a deflection generator output stage, a flyback transformer coupled to said output stage for developing a flyback pulse voltage across a transformer secondary winding, and rectifying and filtering means for developing said steady-state voltage from said flyback pulse voltage.

9. A deflection circuit-derived power supply with a start-up supply for the deflection circuit oscillator, comprising:
 a horizontal oscillator energized by a supply voltage for developing a horizontal frequency switching signal after commencement of oscillator operation;
 a horizontal deflection winding;
 a deflection output stage responsive to said horizontal frequency switching signal for generating scanning current in said deflection winding;
 a flyback transformer having a first winding coupled to said deflection output stage for developing a horizontal frequency alternating polarity output voltage across a plurality of secondary windings;
 supply voltage producing means responsive to the horizontal frequency alternating polarity output voltage developed across one of said plurality of secondary windings for producing said supply voltage after commencement of horizontal oscillator operation; and
 a start-up supply for developing said supply voltage during an initial interval to enable said horizontal oscillator to commence operation, said start-up supply comprising:
  a source of voltage available prior to commencement of horizontal oscillator operation,
  a capacitor,
  means for charging said capacitor from said prior available voltage source, and
  switching means coupled to said capacitor and to said horizontal oscillator for applying said capacitor voltage to said horizontal oscillator as said supply voltage to commence horizontal oscillator operation after said charging means has charged said capacitor to an upper threshold voltage level, said switching means arranged with said capacitor as a relaxation oscillator that begins discharging said capacitor by the load current drawn by said horizontal oscillator after said charging means has charged said capacitor to said upper threshold voltage level and begins recharging said capacitor from said charging means when said capacitor discharges to a lower threshold voltage level.

10. A supply according to claim 9 wherein said switching means comprises a first transistor interposed between said capacitor and said horizontal oscillator and a second transistor coupled to said capacitor and to a control electrode of said first transistor.

11. A supply according to claim 9 wherein said supply voltage producing means comprises means for rectifying and filtering said horizontal frequency alternating polarity output voltage and means for applying the output of said rectifying and filtering means to said capacitor to develop said supply voltage as a substantially constant voltage across said capacitor.

12. A supply according to claim 11 wherein said prior available voltage source comprises a source of DC input voltage of magnitude greater than said substantially constant voltage.

* * * * *